(12) United States Patent
Kumar et al.

(10) Patent No.: US 10,613,620 B2
(45) Date of Patent: *Apr. 7, 2020

(54) PROVIDING PER CORE VOLTAGE AND FREQUENCY CONTROL

(71) Applicant: Intel Corporation, Santa Clara, CA (US)

(72) Inventors: Pankaj Kumar, Chandler, AZ (US); Hang T. Nguyen, Tempe, AZ (US); Christopher Houghton, Westborough, MA (US); David A. Biermann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/966,487

(22) Filed: Apr. 30, 2018

(65) Prior Publication Data

US 2018/0314319 A1    Nov. 1, 2018

Related U.S. Application Data

(63) Continuation of application No. 14/974,064, filed on Dec. 18, 2015, now Pat. No. 9,983,660, which is a
(Continued)

(51) Int. Cl.
*G06F 1/32* (2019.01)
*G06F 1/3296* (2019.01)
(Continued)

(52) U.S. Cl.
CPC ............. *G06F 1/3296* (2013.01); *G05F 1/46* (2013.01); *G06F 1/26* (2013.01); *G06F 1/324* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 5,163,153 A    11/1992 Cole et al.
5,522,087 A    5/1996 Hsiang
(Continued)

FOREIGN PATENT DOCUMENTS

CN    1993669 A1    7/2007
CN    101071329    11/2007
(Continued)

OTHER PUBLICATIONS

Taiwanese Patent Office, Office Action dated Sep. 24, 2015 in Taiwanese Patent Application No. 100134148.
(Continued)

*Primary Examiner* — Zahid Choudhury
(74) *Attorney, Agent, or Firm* — Trop, Pruner & Hu, P.C.

(57) ABSTRACT

In one embodiment, the present invention includes a processor having a plurality of cores and a control logic to control provision of a voltage/frequency to a first core of the plurality of cores independently of provision of a voltage/frequency to at least a second core of the plurality of cores. In some embodiments, the voltages may be provided from one or more internal voltage regulators of the processor. Other embodiments are described and claimed.

20 Claims, 6 Drawing Sheets

Related U.S. Application Data continuation of application No. 14/570,100, filed on Dec. 15, 2014, now Pat. No. 9,348,387, which is a continuation of application No. 13/785,108, filed on Mar. 5, 2013, now Pat. No. 9,032,226, which is a continuation of application No. 12/889,121, filed on Sep. 23, 2010, now Pat. No. 8,943,334.

(51) Int. Cl.
| | | |
|---|---|---|
| G06F 1/324 | (2019.01) | |
| G06F 1/26 | (2006.01) | |
| G06F 1/3206 | (2019.01) | |
| G05F 1/46 | (2006.01) | |
| G06F 1/3228 | (2019.01) | |
| G06F 9/30 | (2018.01) | |

(52) U.S. Cl.
CPC .......... *G06F 1/3206* (2013.01); *G06F 1/3228* (2013.01); *G06F 9/3016* (2013.01); *Y02D 10/126* (2018.01); *Y02D 10/172* (2018.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |
| 7,010,708 | B2 | 3/2006 | Ma |
| 7,043,649 | B2 | 5/2006 | Terrell |
| 7,093,147 | B2 | 8/2006 | Farkas et al. |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |
| 7,290,156 | B2 | 10/2007 | Gaskins |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,529,956 | B2 | 5/2009 | Stufflebeam |
| 7,539,885 | B2 | 5/2009 | Ma |
| 7,721,119 | B2 | 5/2010 | Capps et al. |
| 7,730,340 | B2 | 6/2010 | Hu et al. |
| 7,818,596 | B2 | 10/2010 | Fenger |
| 7,966,506 | B2 | 6/2011 | Bodas |
| 8,209,558 | B2 | 6/2012 | Rozen et al. |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2003/0122429 | A1 | 7/2003 | Zhang et al. |
| 2004/0030942 | A1 | 2/2004 | Barr et al. |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2005/0210905 | A1 | 9/2005 | Burns et al. |
| 2006/0026447 | A1 | 2/2006 | Naveh et al. |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0117202 | A1 | 6/2006 | Magklis et al. |
| 2006/0184287 | A1 | 8/2006 | Belady et al. |
| 2007/0005995 | A1 | 1/2007 | Kardach et al. |
| 2007/0016817 | A1 | 1/2007 | Albonesi et al. |
| 2007/0033425 | A1 | 2/2007 | Clark |
| 2007/0033426 | A1 | 2/2007 | Clark |
| 2007/0079294 | A1 | 4/2007 | Knight |
| 2007/0094444 | A1 | 4/2007 | Sehat |
| 2007/0106827 | A1 | 5/2007 | Boatright et al. |
| 2007/0156370 | A1 | 7/2007 | White et al. |
| 2007/0156992 | A1 | 7/2007 | Jahagirdar |
| 2007/0180279 | A1 | 8/2007 | Sullam |
| 2007/0198870 | A1 | 8/2007 | Cheng et al. |
| 2007/0214342 | A1 | 9/2007 | Newburn |
| 2007/0239398 | A1 | 10/2007 | Song et al. |
| 2007/0245163 | A1 | 10/2007 | Lu et al. |
| 2008/0001634 | A1 | 1/2008 | Arabi et al. |
| 2008/0012583 | A1* | 1/2008 | Audet ................ G06F 1/26 324/713 |
| 2008/0028240 | A1 | 1/2008 | Arai et al. |
| 2008/0104425 | A1 | 5/2008 | Gunther et al. |
| 2008/0162972 | A1 | 7/2008 | Liu |
| 2008/0244294 | A1 | 10/2008 | Allarey |
| 2008/0250260 | A1 | 10/2008 | Tomita |
| 2008/0256381 | A1 | 10/2008 | Jacobwitz et al. |
| 2009/0006871 | A1 | 1/2009 | Liu et al. |
| 2009/0138737 | A1 | 5/2009 | Kim et al. |
| 2009/0150695 | A1 | 6/2009 | Song et al. |
| 2009/0150696 | A1 | 6/2009 | Song et al. |
| 2009/0158061 | A1 | 6/2009 | Schmitz et al. |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0187777 | A1 | 7/2009 | Clark |
| 2009/0235105 | A1 | 9/2009 | Branover et al. |
| 2010/0115304 | A1 | 5/2010 | Finkelstein et al. |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2011/0022857 | A1 | 1/2011 | Nussbaum et al. |
| 2011/0087900 | A1 | 4/2011 | Lakhanpal et al. |
| 2011/0105282 | A1 | 5/2011 | Craig et al. |
| 2011/0154011 | A1 | 6/2011 | Efraim et al. |
| 2011/0154090 | A1 | 6/2011 | Dixon et al. |
| 2012/0066535 | A1 | 3/2012 | Naffziger |
| 2012/0079290 | A1 | 3/2012 | Kumar |
| 2012/0246506 | A1 | 9/2012 | Knight |
| 2013/0061064 | A1 | 3/2013 | Ananthakrishnan et al. |
| 2013/0080803 | A1 | 3/2013 | Ananthakrishnan et al. |
| 2013/0080804 | A1 | 3/2013 | Ananthakrishnan et al. |
| 2013/0111120 | A1 | 5/2013 | Ananthakrishnan et al. |
| 2013/0111121 | A1 | 5/2013 | Ananthakrishnan et al. |
| 2013/0111226 | A1 | 5/2013 | Ananthakrishnan et al. |
| 2013/0111236 | A1 | 5/2013 | Ananthakrishnan et al. |
| 2013/0346774 | A1 | 12/2013 | Bhandaru et al. |
| 2014/0068290 | A1 | 3/2014 | Bhandaru et al. |

FOREIGN PATENT DOCUMENTS

| | | |
|---|---|---|
| CN | 101147154 A | 3/2008 |
| EP | 1736851 | 12/2006 |
| JP | 2004-78940 | 3/2004 |
| JP | 2008-507766 | 3/2008 |
| JP | 2010-522403 | 7/2010 |
| KR | 10-2008-0039824 | 5/2008 |
| KR | 10-2010-0026989 | 3/2010 |
| TW | I260544 | 8/2006 |
| TW | 2007745834 | 12/2007 |
| TW | I317468 | 11/2009 |
| WO | 2012036918 | 3/2012 |

OTHER PUBLICATIONS

U.S. Appl. No. 14/966,273, filed Dec. 11, 2015, entitled "Providing Per Core Voltage and Frequency Control," by Pankaj Kumar, et al.
U.S. Appl. No. 14/966,286, filed Dec. 11, 2015, entitled "Providing Per Core Voltage and Frequency Control," by Pankaj Kumar, et al.
China Patent Office, Office Action dated Nov. 23, 2015 in Chinese Patent Application No. 201180055923.1.

(56) References Cited

OTHER PUBLICATIONS

International Searching Authority, "Notification of Transmittal of the International Search Report and the Written Opinion of the International Searching Authority," dated Mar. 13, 2012, in International application No. PCT/US2011/051957.
United Kingdom Intellectual Property Office, Examination Report dated Mar. 4, 2016 in United Kingdom Patent Application No. 1306874.7.
United Kingdom Intellectual Property Office, Examination Report dated Mar. 4, 2016 in United Kingdom Patent Application No. 1602734.4.
United Kingdom Intellectual Property Office, Examination Report dated Mar. 4, 2016 in United Kingdom Patent Application No. 1601963.0.
United Kingdom Intellectual Property Office, Examination Report dated Mar. 4, 2016 in United Kingdom Patent Application No. 1602733.6.
State Intellectual Property Office of People's Republic China, Third Office Action dated Mar. 29, 2016 in Chinese Patent Application No. 201180055923.1.
Taiwan Intellectual Property Office, Office Action dated May 17, 2016 in Taiwanese Patent Application No. 104144234. (Translation Redacted).
Taiwan Intellectual Property Office, Office Action dated May 16, 2016 in Taiwanese Patent Application No. 104144235. (Translation Redacted).
United Kingdom Intellectual Property Office, Examination Report dated Sep. 8, 2016 in United Kingdom Patent Application No. GB1601963.0.
United Kingdom Intellectual Property Office, Examination Report dated Sep. 8, 2016 in United Kingdom Patent Application No. GB1602733.6.
United Kingdom Intellectual Property Office, Examination Report dated Sep. 8, 2016 in United Kingdom Patent Application No. GB1306874.7.
United Kingdom Intellectual Property Office, Examination Report dated Sep. 8, 2016 in United Kingdom Patent Application No. GB1602734.4.
U.S. Appl. No. 15/135,670, filed Apr. 22, 2016, entitled "Providing Per Core Voltage and Frequency Control" by Pankaj Kumar, et al.
United States Patent and Trademark Office, Non-Final Office Action dated May 31, 2017 and Reply filed Aug. 29, 2017, in U.S. Appl. No. 14/966,286.
United States Patent and Trademark Office, Non-Final Office Action dated Sep. 13, 2017 and Reply filed Jan. 10, 2018 in U.S. Appl. No. 14/966,273.
United States Patent and Trademark Office, Non-Final Office Action dated Oct. 12, 2017, in U.S. Appl. No. 14/974,064.
United States Patent and Trademark Office, Non-Office Action dated Oct. 27, 2017, in U.S. Appl. No. 15/135,670.
State Intellectual Property Office of The People's Republic of China, First Office Action dated Dec. 26, 2017, in Chinese Patent Application No. 201610029935.1.
Japan Patent Office, Office Action dated Dec. 1, 2014, In Japanese Patent Application No. 2013-530201.
German Patent Office, Office Action dated Dec. 10, 2014, In German Patent Application No. 112011103193.9.
German patent and Trademark Office, Office Action dated Feb. 5, 2014 in German application No. 11 2011 103 193.9.
Japanese Patent Office, Office Action dated Apr. 1, 2014 in Japanese Patent Application No. 2013-530201.
Intel Technology Journal., "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.
Intellectual Property India, Examination Report dated Mar. 1, 2019 in Indian Patent Application No. 2377/CHENP/2013.

* cited by examiner

PROVIDING PER CORE VOLTAGE AND FREQUENCY CONTROL

This application is a continuation of U.S. patent application Ser. No. 14/974,064, filed Dec. 18, 2015, which is continuation of Ser. No. 14/570,100, filed Dec. 15, 2014, now U.S. Pat. No. 9,348,387, issued May 24, 2016, which is a continuation of U.S. patent application Ser. No. 13/785,108, filed Mar. 5, 2013, now U.S. Pat. No. 9,032,226, issued May 12, 2015, which is a continuation of U.S. patent application Ser. No. 12/889,121, filed Sep. 23, 2010, now U.S. Pat. No. 8,943,334, issued Jan. 27, 2015, the content of which is hereby incorporated by reference.

BACKGROUND

Power and thermal management issues are considerations in all segments of computer-based systems. While in the server domain, the cost of electricity drives the need for low power systems, in mobile systems battery life and thermal limitations make these issues relevant. Optimizing a system for maximum performance at minimum power consumption is usually done using the operating system (OS) or system software to control hardware elements. Most modern OS's use the Advanced Configuration and Power Interface (ACPI) standard, e.g., Rev. 3.0b, published Oct. 10, 2006, for optimizing the system in these areas. An ACPI implementation allows a processor core to be in different power-saving states (also termed low power or idle states), generally referred to as so-called C1 to Cn states. Similar package C-states exist for package-level power savings but are not OS-visible.

When a core is active, it runs at a so-called C0 state, and when the core is idle, it may be placed in a core low power state, a so-called core non-zero C-state. The core C1 state represents the low power state that has the least power savings but can be entered and exited almost immediately, while an extended deep-low power state (e.g., C3) represents a power state where the static power consumption is negligible, but the time to enter/exit this state and respond to activity (i.e., back to C0) is longer.

In addition to power-saving states, performance states or so-called P-states are also provided in ACPI. These performance states may allow control of performance-power levels while a core is in an active state (C0). In general, multiple P-states may be available, namely from P0-PN. In general, the ACPI P-state control algorithm is to optimize power consumption without impacting performance. The state corresponding to P0 may operate the core at a maximum voltage and frequency combination for the core, while each P-state, e.g., P1-PN, operates the core at different voltage and/or frequency combinations. In this way, a balance of performance and power consumption can occur when the processor is active based on utilization of the processor. While different P-states can be used during an active mode, there is no ability for independent P-states for different cores operating at different voltages and frequencies of a multi-core processor, and accordingly, optimal power savings cannot be attained while achieving a desired performance level, since at best all active cores may be able to operate at different frequencies but they all must share the same voltage.

DETAILED DESCRIPTION

Figure 1:
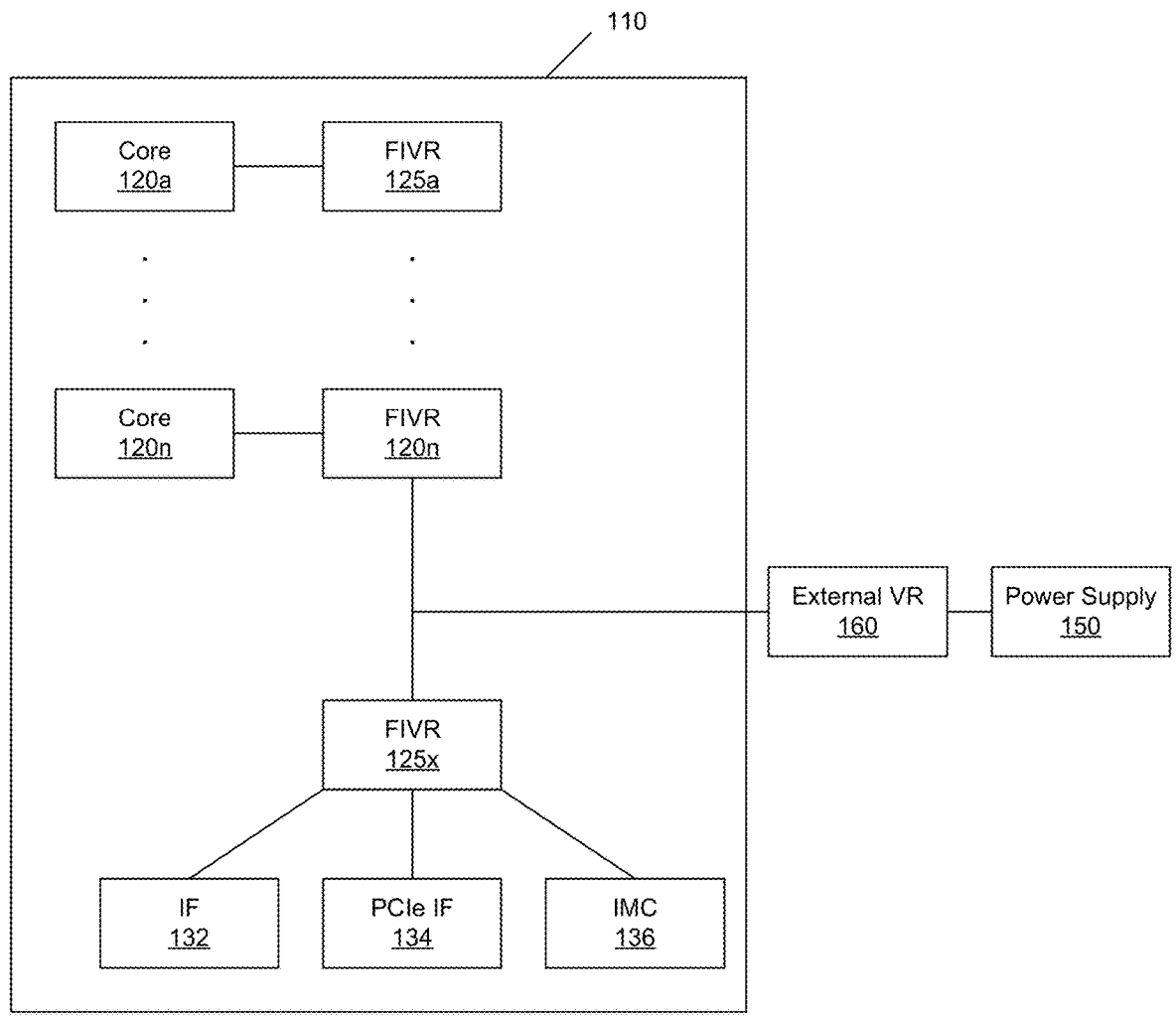
FIG. 1 is a block diagram of a system in accordance with one embodiment of the present invention.

In various embodiments, a processor having a multi-core architecture may provide for per core control of power-performance (P)-states, e.g., in accordance with an ACPI specification. In this way, better control over power consumption and performance can be realized. For example, in a multi-core processor only a few cores may be enabled to run at a higher core frequency in a thermally constrained environment, enabling execution of a desired workload while reducing power consumption and thus temperature.

Thus in various embodiments, each of multiple cores within a processor may be controlled to operate at a different voltage and/or frequency. In this way, asymmetric workloads may be executed on the multiple cores to provide for deterministic performance. While the scope of the present invention is not limited in this regard, in some embodiments the independent voltage/frequency control may be realized using a fully integrated voltage regulator (FIVR) implementation in which each core within a processor has its own voltage regulator. That is, a single semiconductor die that includes multiple cores may further include multiple independent voltage regulators, each associated with a given core. Furthermore, one or more additional voltage regulators may be provided for use with other components within a processor such as uncore logic, memory controller logic, power control unit, and so forth. Of course, in some embodiments a single voltage regulator may be associated with one or more cores and/or other components of a processor. In one embodiment, a dedicated voltage regulator may be provided for uncore circuitry of a processor, which would allow the uncore to run at a different voltage and frequency. For a compute centric workload, the uncore can be run at a lower voltage and frequency, resulting in applying power savings toward higher core frequencies at a socket level. For memory and IO intensive workloads, the uncore can be run at a higher voltage and frequency, while the cores can run at lower voltages/frequencies, compensating for higher power in the uncore.

In some embodiments, ACPI tables may be extended to include information regarding these individual integrated voltage regulators to enable per core P-state control. For example, a 4-bit field may be used to pass P-state information and map it to control voltage logic for each regulator. Thus using embodiments of the present invention, each core may be controlled to operate at a different frequency and/or voltage for an asymmetric workload. As one example, one or a few of multiple cores can be controlled to operate at higher frequencies and/or voltages while the remaining cores are controlled to operate at lower voltage/frequency combinations to thus stay within a given thermal design power (TDP) envelope. In this way, deterministic and optimal performance capability selection can be realized for given workloads.

For example, cores that seek a higher performance level to process data in a first manner can operate at a higher voltage/frequency (such cores may execute tasks such as data processing usage such as data-duplication services, data analytics, parity computations or so forth), while cores executing, e.g., management tasks, can run at lower voltages/frequencies to provide for an optimal mix for a TDP-constrained environment. Thus rather than opportunistically running all cores at a higher frequency when possible (as with a so-called turbo mode) given a thermal or TDP budget, embodiments provide for deterministic behavior on an individual core basis.

Referring now to FIG. 1, shown is a block diagram of a portion of a system in accordance with an embodiment of the present invention. As shown in FIG. 1, system 100 may include various components, including a processor 110 which as shown is a multi-core processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_a$-$125_n$. Accordingly, a fully integrated voltage regulator (FIVR) implementation may be provided to thus allow for fine-grained control of voltage and thus power and performance of each individual core.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007). While not shown for ease of illustration, understand that additional components may be present within processor 110 such as uncore logic, a power control unit, and other components such as internal memories, e.g., one or more levels of a cache memory hierarchy and so forth. Furthermore, while shown in the implementation of FIG. 1 with an integrated voltage regulator, embodiments are not so limited.

Figure 2:
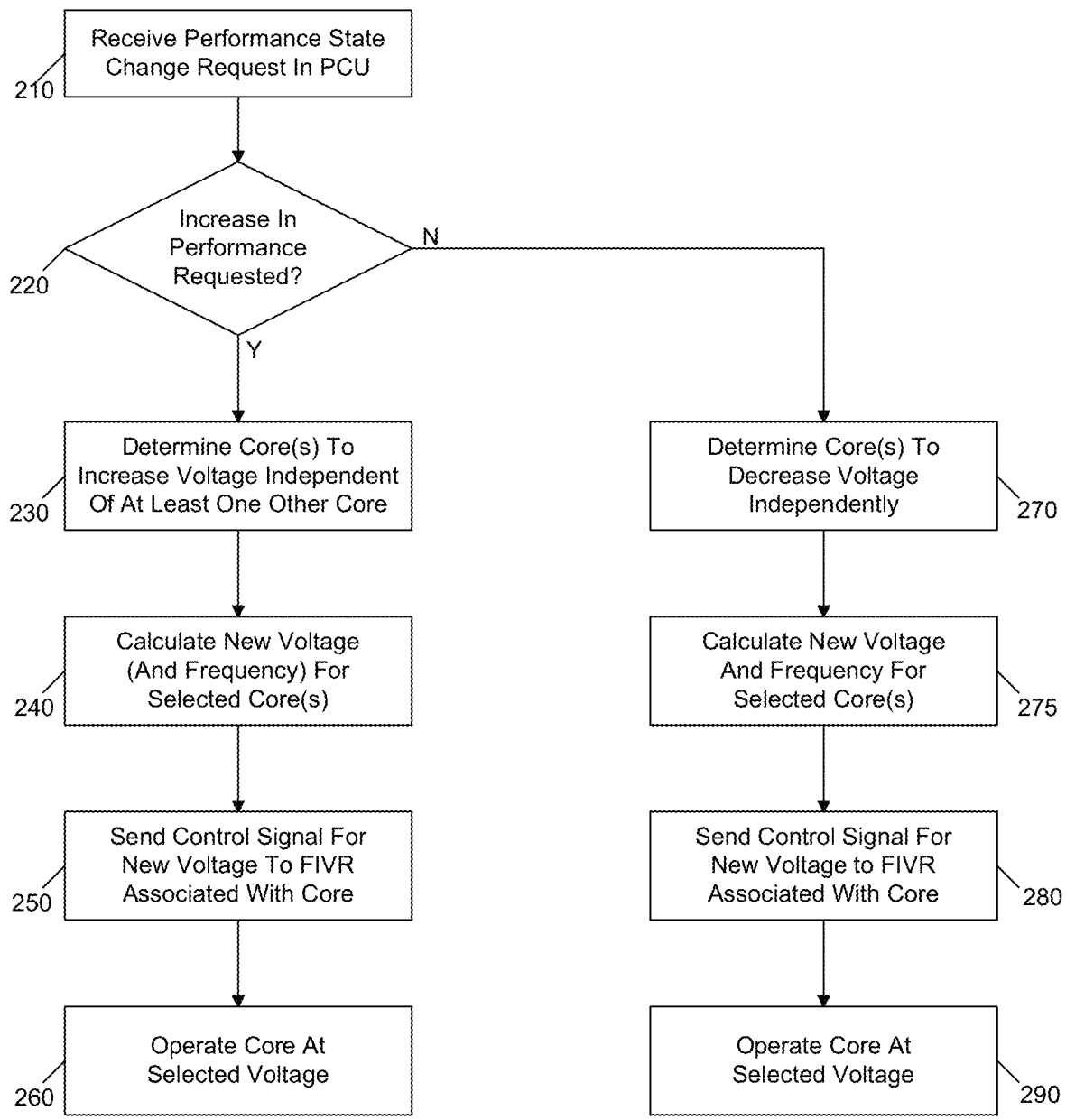
FIG. 2 is a flow diagram of a method in accordance with one embodiment of the present invention.

Referring now to FIG. 2, shown is a flow diagram of a method in accordance with one embodiment of the present invention. Method 200 may be performed, in one embodiment, by a controller such as an integrated power control unit (PCU) of a processor. However, understand that the scope of the present invention is not limited in this regard and method 200 may be performed by other controllers within a system such as a management engine.

With reference to FIG. 2, method 200 may begin by receiving a performance state change request in the PCU (block 210). For example, in many implementations this request may be received from the OS or system software. As an example, this request may correspond to a request to change a P-state for one or more cores. That is, in such implementations, the OS may be aware of the per core P-state control provided by embodiments of the present invention. In other embodiments, even when the OS or system software is not aware of this feature, a performance state change request may be received and handled as discussed herein.

At diamond 220 it may be determined whether an increase in performance is requested. That is, the request may be an identification of a higher performance level (e.g., corresponding to a lower than current P-state such as a request to enter the P0 state from the P1 state). Note also that this determination may also confirm that it is possible to change P-state from the current state. If so, control passes to block 230. At block 230, a determination may be made as to a selection of one or more cores to increase its voltage independently of at least another core (block 230). As examples of this decision, the PCU may determine to increase voltage and associated frequency based on TDP margin that depends upon various factors such as overall die current, power, temperature, and micro-architectural activities (such as load/store buffers, a thread scheduler or so forth). For example, where a portion of a multi-core processor is determined to be cooler (and operating at lower voltage/frequency), a core within this portion may be selected for increased voltage and frequency When the one or more cores selected for increased voltage are determined, control passes to block 240, where a new voltage and frequency are calculated for the selected core(s). Such calculations may be based at least in part on a TDP specification for the processor, Icc headroom and so forth.

Still referring to FIG. 2, control passes next to block 250 where a control signal for the new voltage may be sent to the voltage regulator associated with the core or cores. As an example, this control signal may be a digital control signal or it may be an analog signal to thus cause the voltage regulator to initiate a change to a different voltage level. Accordingly, the FIVR associated with the core(s) may be adjusted to thus output an updated voltage to the core. Thus, control passes to block 260, where the core may operate at the selected voltage. Note that because in many embodiments the voltage regulator may be integrated within the processor, this adjustment may occur with reduced latency as compared to an off-chip regulator.

If instead it is determined at diamond 220 that a decrease in performance is requested, control passes to block 270. At block 270, a determination may be made as to a selection of one or more cores to decrease voltage independently of at least another core (block 270). Such decision may be based on factors such as described above, and may include a determination that movement to a different P-state is permitted.

When the one or more cores selected for decreased voltage are determined, control passes to block 275, where a new voltage and frequency may be calculated for the selected core(s). Control passes next to block 280 where a control signal for the new voltage may be sent to the voltage regulator associated with the core or cores to cause the FIVR associated with the core(s) to output a decreased voltage to the core. Accordingly, control passes to block 290, where the core may operate at the selected voltage. While shown with this particular implementation in the embodiment of FIG. 2, understand the scope of the present invention is not limited in this regard. For example, the above discussion assumes that the PCU and the cores are part of the same semiconductor die, e.g., of a multicore processor. In other embodiments, the cores may be on independent dies but of the same multichip package. In still further embodiments, cores may be in separate packages but have their voltage/frequency controlled in common, e.g., using coordinated voltage regulators.

One alternate embodiment is an implementation in which a processor does not include integrated regulators. In such processors, embodiments can still be accommodated to provide per core P-state control. To that end, instead at blocks 250 or 280, control signals for different voltages can be provided, e.g., to the cores directly, where the cores can provide for voltage adjustments based on the received a voltage. In yet further embodiments, at blocks 250 and 280 the control signals for the changed voltage can be provided off-chip to an external voltage regulator. This control signal may be transmitted on a single pin or multiple pins, where each of the multiple pins is associated with a different voltage level to cause the external voltage regulator to provide one of multiple voltages. Specifically in such implementations, the external voltage regulator may output multiple voltage signals, which can be coupled to the processor and in turn, e.g., to a voltage transmission logic of the processor which can further receive control signals from the power control unit to thus enable selected voltages to be provided to the corresponding cores, as determined by the power control unit.

In yet other embodiments, for example, in a multi-OS system where a number of cores can be dedicated to one OS and a different number of cores are dedicated to a different OS, each core in one OS domain can be statically set to a fixed (and possibly different) V/F, while the cores in another OS domain can vary V/F dynamically during operation. For example, one OS domain may be dedicated to deterministic operations such as management operations for a system and thus can benefit from fixed V/F control. In contrast, an OS domain in which various user-level applications are executed may have non-deterministic workloads and thus may benefit from dynamic independent V/F control in accordance with an embodiment of the present invention.

In some embodiments, for dynamic control of core V/F, the PCU can, independently of the OS, monitor micro-architectural activities and determine if one or more core's V/F can be dynamically changed to reduce/increase power, depending on the required load demand.

Figure 3:
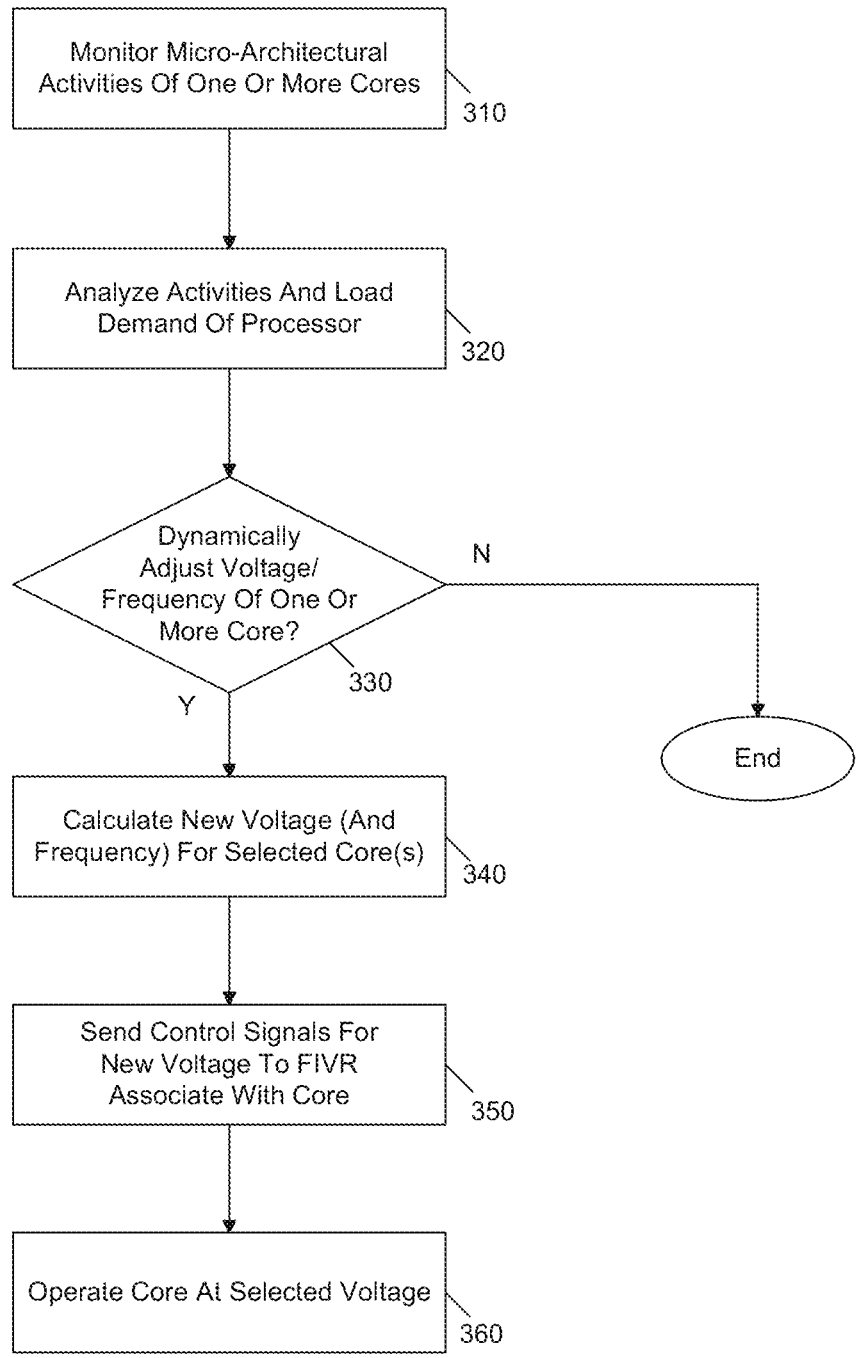
FIG. 3 is a flow diagram of a method in accordance with another embodiment of the present invention.

Referring now to FIG. 3, shown is a flow diagram of a method in accordance with one embodiment of the present invention. As shown in FIG. 3, method 300 may be executed by a power control unit of a processor. Thus method 300 may be appropriate where an OS is not aware of the per core P-state capabilities provided by an embodiment of the present invention. In still further embodiments, method 300 may be performed in connection with method 200 described above in situations where the OS is aware of the P-state capability, to provide for improved dynamic control of core P-states.

As seen in FIG. 3, method 300 may begin by monitoring micro-architectural activities of one or more cores (block 310). While the scope of the present invention is not limited in this regard, such activities may include determining a number of instructions executed in a time window, retirements per time window or so forth.

Responsive to information obtained from the micro-architectural activities, an analysis may be performed by the power control unit. More specifically, at block 320 the power control unit may analyze the activities as well as a load demand of the processor. For example, the load demand may be based on information regarding the number of threads scheduled to the cores and the types of processes for which these threads are scheduled.

Control then passes to diamond 330, where the power control unit may determine whether dynamic adjustment of at least one of voltage/frequency for one or more cores is appropriate. For example, if the activities and the load demand indicate that an appropriate trade-off between power and performance is occurring, the power control unit may choose not to dynamically adjust any voltage/frequency combination. Accordingly, method 300 may conclude.

Otherwise, if it is determined to adjust at least one voltage/frequency pair for a given core, control instead passes to block 340. There, a new voltage and frequency pair may be calculated for the selected core(s).

Still referring to FIG. 3, control passes next to block 350 where a control signal for the new voltage can be sent to the voltage regulator associated with the core or cores to be updated with a new voltage. In this way, the FIVR associated with the core(s) may be adjusted to thus output an updated voltage to the core. Thus, control passes to block 360, where the core may operate at the selected voltage. While shown with this particular implementation in the embodiment of FIG. 3, understand the scope of the present invention is not limited in this regard.

For example, in other embodiments not only can the V/F of one or more core(s) dynamically change, but also the uncore frequency and voltage can change to support the required core V/F demand. The uncore frequency is not visible to an OS, but can contribute to the overall die power savings. The uncore power savings can be applied toward core power that would result in increased core performance. Similarly, the core power savings can be applied to increased uncore voltage/frequency to accommodate workloads that may require higher uncore frequency. In some implementations, this dynamic uncore change can be performed using method 300 of FIG. 3.

Figure 4:
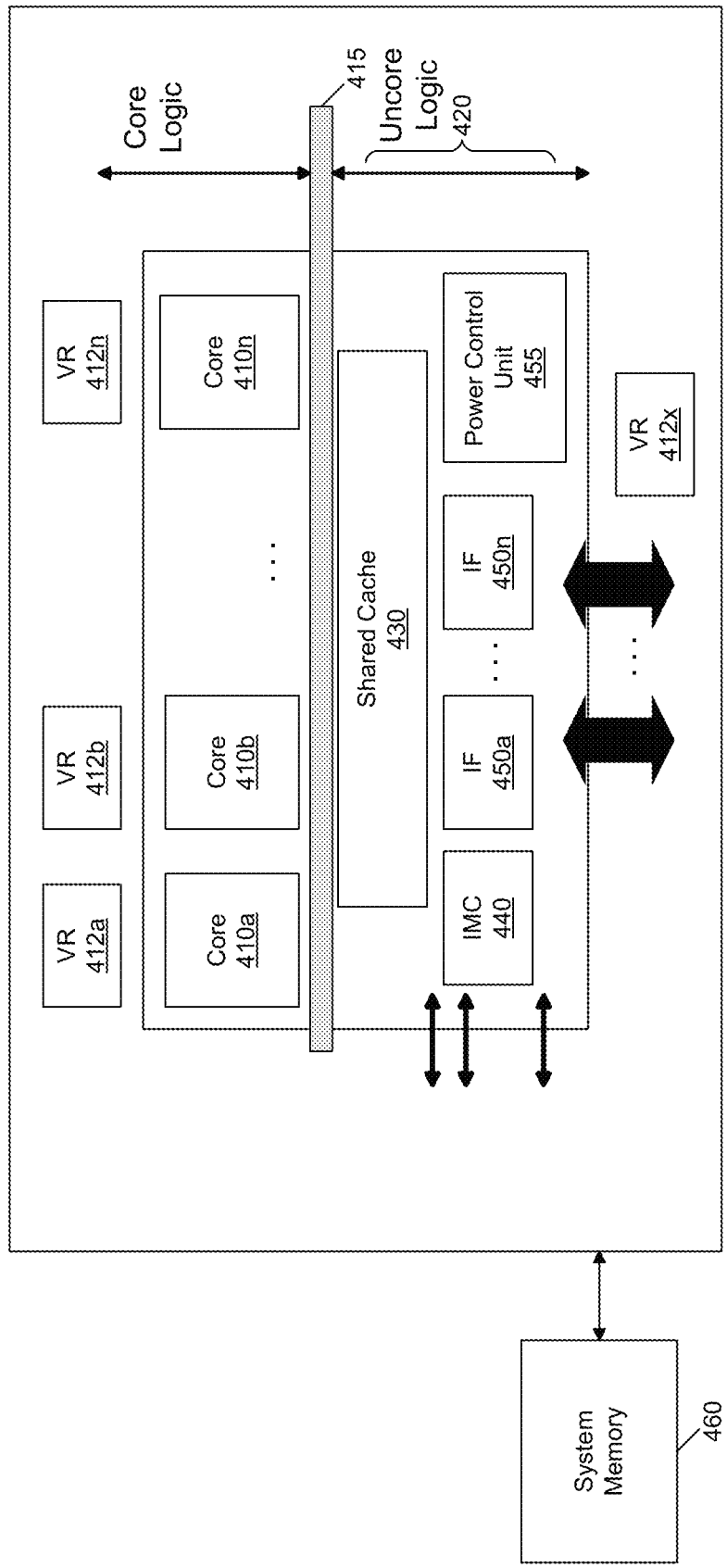
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be configured to operate at multiple voltages and/or frequencies. In addition, each core may be independently controlled to operate at a selected voltage and/or frequency, as discussed above. To this end, each core may be associated with a corresponding voltage regulator 412a-412n. The various cores may be coupled via an interconnect 415 to an uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may be in communication with OS power management code. For example, based on a request received from the OS and information regarding the workloads being processed by the cores, power control unit 455 may determine an appropriate combination of voltage and frequency for operating each of the cores, such as described above with respect to FIG. 2. For example, power control unit 455 may include a table having entries each of which associates a voltage and frequency at which each core is executing. In addition, unit 455 may include a storage having information regarding a TDP or other thermal budget. Based on all of this information, power control unit 455 can dynamically and independently control a frequency and/or voltage to one or more cores to enable deterministic operation and provide for asymmetric workloads to the cores, while remaining within the TDP budget, and further without the need for opportunistic turbo mode operation. Thus responsive to such calculations, power control unit 455 may generate a plurality of control signals to cause the voltage regulators to control the voltage provided to the corresponding cores accordingly.

In addition, power control unit 455 may independently determine that a change in voltage/frequency is appropriate for one or more cores as discussed above with regard to FIG. 3. In some implementations, the analysis performed by power control unit 455 may be based at least in part on prediction information determined by an activity monitor logic, which may be part of the power control unit. This logic may include a buffer to store information associated with operating cores. The activity monitor may receive incoming data from the various cores regarding their current activity levels. The buffer of the activity monitor may be arranged in various manners. In one embodiment, the buffer may be adapted to store for each core, an indication of a time stamp associated with each power state change event. The activity monitor thus intercepts and time stamps the events in which cores enter and exit given activity states. This monitored data may thus include time stamp data as well as the activity state to indicate, during the interval of storage, how long each core was in a given state, and may be provided to, e.g., a predictor of the power control unit, which may use this information to determine predicted core states for the next interval, which can be used in selection of independent frequency and/or voltage at which to operate the core(s).

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
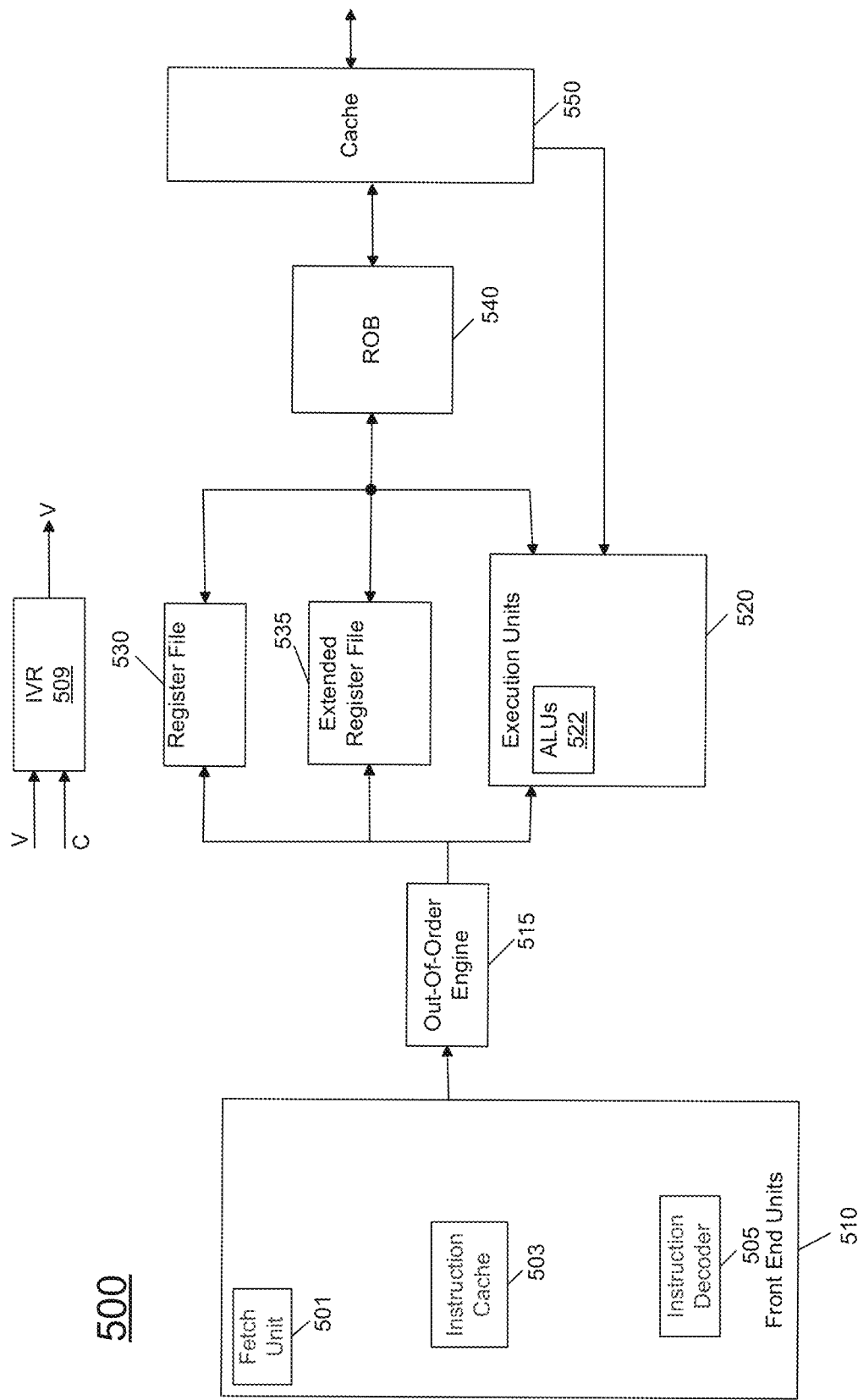
FIG. 5 is a block diagram of a processor core in accordance with an embodiment of the present invention.

Referring now to FIG. 5, shown is a block diagram of a processor core in accordance with one embodiment of the present invention. As shown in FIG. 5, processor core 500 may be a multi-stage pipelined out-of-order processor. As shown in FIG. 5, core 500 may operate an various voltages and frequencies as a result of integrated voltage regulator 509. In various embodiments, this regulator may receive an incoming voltage signal, e.g., from an external voltage regulator and may further receive one or more control signals, e.g., from uncore logic coupled to core 500.

As seen in FIG. 5, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
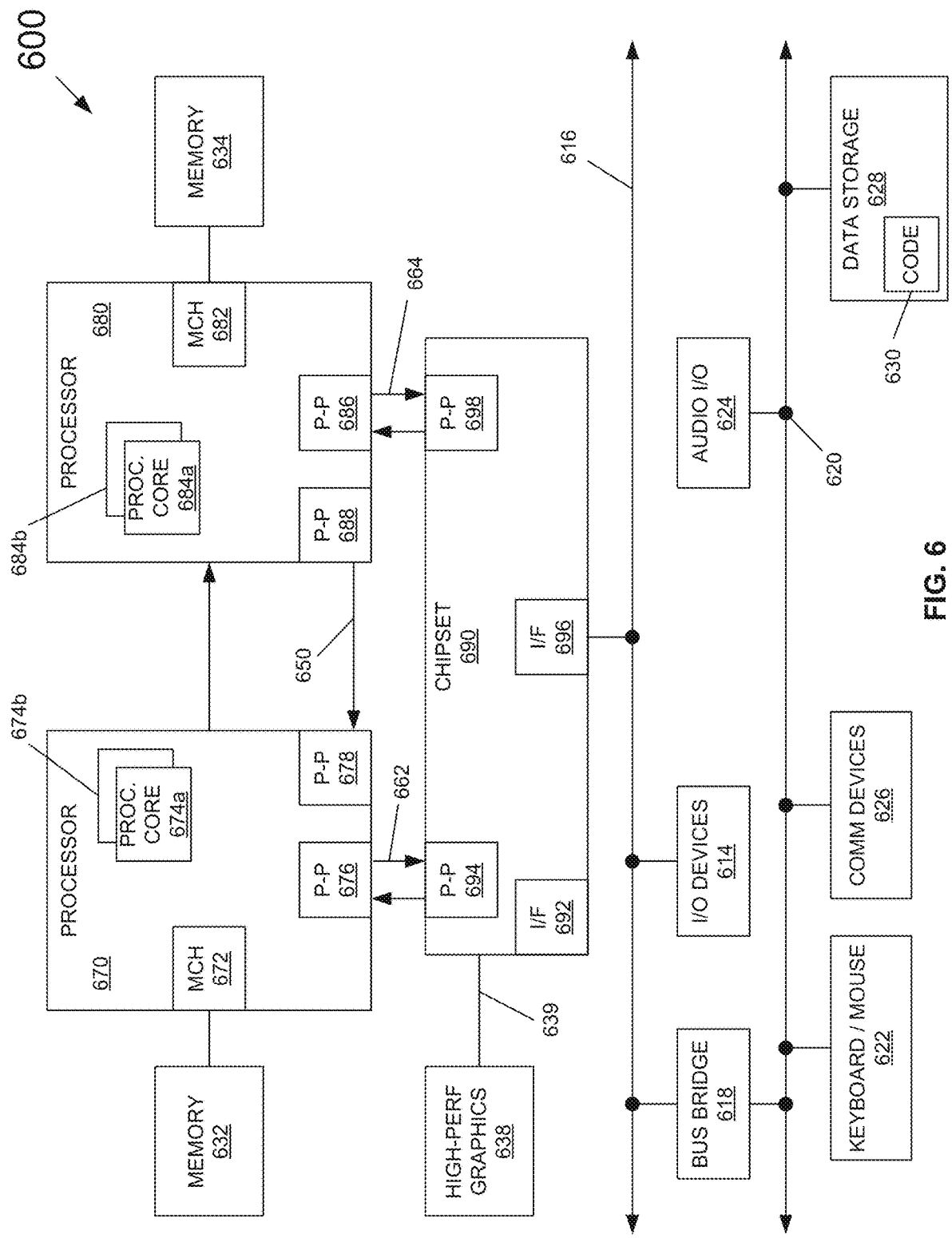
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674*a* and 674*b* and processor cores 684*a* and 684*b*), although potentially many more cores may be present in the processors. Each of the cores may operate at independent voltages/frequencies using multiple independent voltage regulators present within the processors (not shown for ease of illustration in the embodiment of FIG. 6).

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In addition chipset 690 may include an interface 695, which may be a storage controller to interface with a storage 619. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a plurality of cores formed on a semiconductor die, at least one of the plurality of cores including an instruction cache, a decoder to decode instructions, at least one execution unit to execute the decoded instructions, one or more register files, and at least one core-included cache memory, wherein the at least one of the plurality of cores comprises an out-of-order pipeline;
    a shared cache memory;
    at least one integrated voltage regulator formed on the semiconductor die; and
    a power controller to update a voltage/frequency of a first core of the plurality of cores to cause the first core to change operation from a first performance state to a second performance state while a voltage/frequency and a performance state of at least a second core of the plurality of cores are unchanged, wherein the first core and the second core are to execute asymmetric workloads, the power controller to update the voltage/frequency of the first core based at least in part on a workload and a temperature of the processor, wherein the power controller is to send a control signal to the at least one integrated voltage regulator to cause the at least one integrated voltage regulator to provide the updated voltage to the first core.

2. The processor of claim 1, wherein the power controller is to control the voltage/frequency of the first core while remaining within a thermal budget.

3. The processor of claim 2, wherein the temperature comprises a temperature of the first core.

4. The processor of claim 1, wherein the plurality of cores, the shared cache memory and the at least one integrated voltage regulator are formed on the semiconductor die comprising a single semiconductor die.

5. The processor of claim 1, wherein the second performance state is greater than the first performance state.

6. The processor of claim 5, wherein the performance state of the second core is less than the second performance state.

7. The processor of claim 5, wherein the second performance state comprises a turbo mode.

8. The processor of claim 1, wherein the power controller is to cause the second core to be maintained in the unchanged performance state when the processor is in a thermal condition.

9. The processor of claim 1, wherein the first core is located in a first region of the semiconductor die, the first region cooler than a second region of the semiconductor die including the second core.

10. The processor of claim 1, wherein the power controller is to receive a performance state change request from an operating system (OS) for dynamic update of the voltage/frequency of the first core during OS operation, and determine whether to update the voltage/frequency based at least in part on the performance state change request.

11. The processor of claim 1, wherein the first core is to execute a first workload and the second core is to execute a second workload.

12. The processor of claim 1, further comprising an uncore circuit comprising the power controller, the uncore circuit to operate at a first voltage and a first frequency for a first workload and to operate at a second voltage and a second frequency for a second workload.

13. The processor of claim 1, wherein the processor comprises a multichip package including the semiconductor die and a second semiconductor die.

14. The processor of claim 1, wherein the power controller is to update the voltage/frequency of the first core based at least in part on the workload, a thermal design power (TDP) budget and the temperature of the processor.

15. An apparatus comprising:
    a plurality of cores formed on a semiconductor die, at least one of the plurality of cores including an instruction cache, a decoder to decode instructions, at least one execution unit to execute the decoded instructions, one or more register files, and at least one core-included cache memory, wherein the at least one of the plurality of cores comprises an out-of-order pipeline;
    a shared cache memory;
    at least one integrated voltage regulator means formed on the semiconductor die; and
    power control means for updating a voltage/frequency of a first core of the plurality of cores to cause the first core to change operation from a first performance state to a second performance state while a voltage/frequency and a performance state of at least a second core of the plurality of cores are unchanged, wherein the first core and the second core are to execute asymmetric workloads, the power control means for updating the voltage/frequency of the first core based at least in part on a workload and a temperature of the apparatus, wherein the power control means for sending a control signal to the at least one integrated voltage regulator means for causing the at least one integrated voltage regulator means to provide the updated voltage to the first core.

16. The apparatus of claim 15, wherein the power control means includes:
    activity monitor means for monitoring micro-architectural activity, including instruction execution information, of the plurality of cores; and
    prediction means for predicting a usage of the first core in a future time period based on information from the activity monitor means.

17. The apparatus of claim 15, wherein the power control means for updating the voltage/frequency of the first core based at least in part on the workload, a thermal design power (TDP) budget and the temperature of the apparatus.

18. A non-transitory machine-readable medium having stored thereon instructions, which if performed by a machine cause the machine to perform a method comprising:

updating, by a first logic of a multicore processor including a plurality of cores, provision of a voltage/frequency to a first core of the plurality of cores based at least in part on a workload and a temperature of the multicore processor to cause the first core to operate at an updated performance state while a voltage/frequency provided to at least a second core of the plurality of cores is unchanged, the first core and the second core to execute asymmetric workloads, wherein at least one of the plurality of cores includes a decoder to decode instructions, at least one execution unit to execute the decoded instructions, and at least one core-included cache memory, wherein the first core comprises an out-of-order pipeline, the multicore processor further including a shared cache memory, an integrated memory controller, and an integrated voltage regulator; and sending a control signal to the integrated voltage regulator to cause the integrated voltage regulator to provide the updated voltage to the first core.

19. The non-transitory machine-readable medium of claim 18, wherein the method further comprises:

dynamically controlling an independent voltage/frequency for a first set of cores of the multicore processor; and controlling a second set of cores of the multicore processor to receive a fixed voltage/frequency.

20. The non-transitory machine-readable medium of claim 18, wherein the method further comprises:

updating, by the first logic of the multicore processor, provision of the voltage/frequency to the first core of the plurality of cores based at least in part on the workload, a thermal design power (TDP) budget and the temperature of the multicore processor.

* * * * *